United States Patent [19]

Takada

[11] 4,185,791
[45] Jan. 29, 1980

[54] DEVICE FOR PREVENTING A BELT FROM BEING PULLED FROM A RETRACTOR

[75] Inventor: Juichiro Takada, Tokyo, Japan

[73] Assignee: Takata Kojyo Co., Ltd., Tokyo, Japan

[21] Appl. No.: 950,019

[22] Filed: Oct. 10, 1978

[30] Foreign Application Priority Data

Oct. 24, 1977 [JP] Japan .................. 52-141914[U]

[51] Int. Cl.² ................ A62B 35/00; B65H 75/48
[52] U.S. Cl. .................. 242/107.2; 297/476; 280/802
[58] Field of Search ............ 242/107.2, 107.4 R, 242/107.4 B, 107.3; 297/388, 389; 280/744–747; 188/136, 188

[56] References Cited

U.S. PATENT DOCUMENTS

| | | | |
|---|---|---|---|
| 3,486,792 | 12/1969 | Stoffel | 242/107.2 X |
| 3,817,473 | 6/1974 | Board et al. | 242/107.2 |
| 3,847,434 | 11/1974 | Weman | 242/107.2 X |
| 3,911,535 | 10/1975 | Mauron | 297/389 X |
| 4,120,466 | 10/1978 | Adomeit | 242/107.2 |

Primary Examiner—John M. Jillions
Attorney, Agent, or Firm—Brumbaugh, Graves, Donohue & Raymond

[57] ABSTRACT

A device for preventing a belt from being pulled from a retractor comprises a clamp holder and a base member having closely spaced surfaces defining a gap through which the belt passes and from which the belt runs off forwardly at an angle away from the base member. The holder receives a clamp which has a gripping surface protruding slightly from the holder surface and, in part, defining the gap. The holder is pivoted on the base member, and the clamp and holder are spring-loaded about the pivot axis in a direction which holds the clamp out of engagement with the belt. An abrupt force tending to pull the belt abruptly forward through the gap forces the holder to pivot or rock rearwardly, thus engaging the gripping surface of the clamp with the belt. Forwardly oblique, transverse wedging surfaces on the clamp and clamp holder wedge the clamp tightly against the belt and prevent it from being pulled forward.

1 Claim, 7 Drawing Figures

DEVICE FOR PREVENTING A BELT FROM BEING PULLED FROM A RETRACTOR

BACKGROUND OF THE INVENTION

This invention relates to a device for preventing a belt from being pulled from a retractor, such as an inboard retractor at the center of a car in a passive vehicle occupant restraint system, after emergency locking of the belt at the time of collision of the car.

A conventional belt retractor commonly used in a vehicle occupant restraint system has an emergency locking machanism which prevents the belt from being pulled out upon the deceleration or acceleration of the car at the time of collision. This type of retractor, which is often called a lock retractor, usually operates by automatically preventing the belt reel of the retractor from rotating. However, when a strong pull-out force acts on the belt, elongation of the belt itself or looseness in the belt loops wound on the retractor reel, or both, can allow considerable slackening of the belt even though the lock mechanism, as intended, does prevent the reel from unrolling.

Since this problem of slackening of the belt has been found to be substantial with many known systems, various proposals for solving it have been made. According to one proposed solution, the belt is led out of the retractor via a roller which ims prevented from rotating when a reel engages a lock bar so that when a large force is applied to the seat belt, a friction between the seat belt and the roller minimizes further pulling out of the belt. Although the simple construction of this device is an advantage, it involves the problem of weakening of the seat belt because the belt is subject to abrasion and wear from moving along the roller. Since substantially the same portion of the seat belt tends to be brought under friction contact with the roller in normal use, the service life of the seat belt itself is reduced.

The present invention provides a novel device which solves the above-mentioned problems of previously known devices very effectively. In particular, a device, according to the present invention, comprises a clamp holder and a base member having closely spaced surfaces defining a narrow gap through which the belt passes and from which the belt runs off forwardly at an angle generally away from the base member. The clamp member carries a clamp having a belt gripping surface which is generally contiguous to but protrudes slightly from the surface of the clamp holder and defines part of the belt receiving gap. There are generally matching wedge surfaces on the clamp holder and clamp which are oriented forwardly obliquely and transversely to the belt-receiving gap and are adapted selectively to wedge the clamp into engagement with the belt upon an abrupt movement of the belt forwardly through the gap. The clamp holder is pivoted about an axis that is transverse to the direction of movement of the belt, spaced from the gap and located between the forward end of the gap and the rearward end of the gripping surface of the clamp. The clamp and clamp holder are resiliently urged about the pivot axis in the direction tending to move the nose portion of the clamp holder toward the surface of the base member and hold the clamp away from the belt.

Upon an abrupt force exerted on the nose portion of the clamp holder when the belt is pulled sharply, the clamp holder pivots in opposition to the spring force such that the clamp is moved into engagement with the belt, whereupon the clamp is pulled forward and is wedged toward the surface of the base and grips the belt against further forward movement.

One advantage of the device is that under normal movements of the belt as it is pulled out and retracted by the occupant or by some mechanism forming part of a passive restraint system, the belt moves easily over a smooth surface and is subject to little abrasion and wear. When the device operates in an emergency situation, on the other hand, the amount of surface area of the belt clamped between the clamp and the base surface is relatively large, thus affording effective restraint with a minimum of risk of causing the belt to break. Devices which grip a belt along a narrow band present a greater risk of belt breakage. Inasmuch as the device is entirely self-contained, it can easily be used in connection with a conventional retractor without any modification of the retractor. On the other hand, the device can readily be built into a retractor.

For a better understanding of the invention, reference may be made to the following description of an exemplary embodiment, taken in conjunction with the figures of the accompanying drawings.

DESCRIPTION OF AN EXEMPLARY EMBODIMENT

Figure 1:
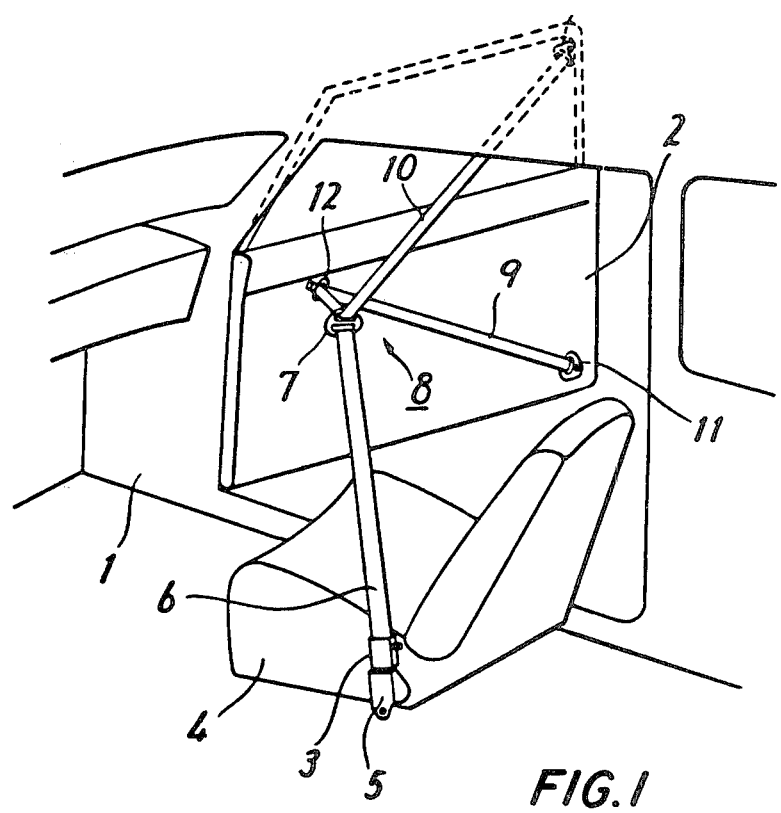
FIG. 1 is a pictorial view, in generally schematic form, of a passive vehicle occupant restraint system in which an embodiment of the invention is used.

FIG. 1 shows, as an example of the use of the present invention, a passive vehicle occupant restraint belt system. The system includes a continuous belt 8 which is fixed at one end to the upper rear portion of the inside of a vehicle door 2 by means of a buckle 3. The belt 8 leads from the buckle 3 through a ring 7 which is attached to the end of a retractor belt 6, leads from the ring through a transfer quide 12 which is suitably arranged and operated to be moved generally diagonally along the door from a location near an anchor 11 at the lower rear corner of the door up to a position near the upper front corner of the door panel (below the window), as shown in FIG. 1. Mechanisms for moving a transfer guide along a door are known in the art and need not be described here. The belt 8 leads from the guide 12 to the anchor 11.

The retractor or control belt 6 is connected to an emergency locking retractor 5 mounted on the rear portion of the inboard side of the passenger seat 4 or attached to the floor near that location. The retractor 5 allows the control belt 6 to be pulled out into the position shown in FIG. 1 when the door is opened, and in that position the restraint belt 8 is positioned relatively close to the inside surface of the door, thus allowing a passenger readily and easily to enter or leave the vehicle without being obstructed by the belt. When the door is closed, the retractor 5 draws in the retractor belt 6, thus moving the ring 7 into a position near the inboard side of the seat 4. Meanwhile the mechanism associated with the guide 12 moves the guide back to a position close to the anchor 11. Thus, when the door is closed, the passenger is restrained by a shoulder belt portion 10 and a lap belt portion 9 of the restraint belt 8, the ring 7 representing a point or zone of demarcation between the lap belt and seat belt portions. A device embodying the present invention, which is designated generally by the reference numeral 13, is mounted on the inboard side of the vehicle seat 4 in a position close to the retractor 5.

Figure 2:
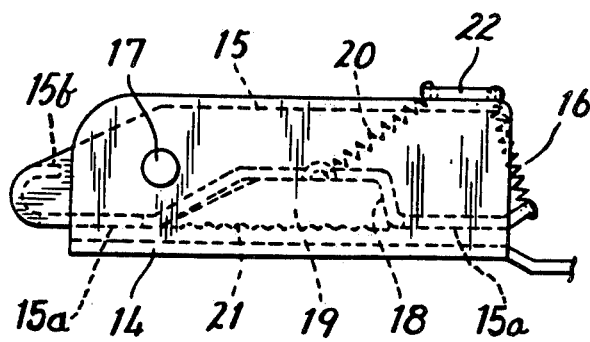
FIG. 2 is a side elevational view of the embodiment.
Figure 3:
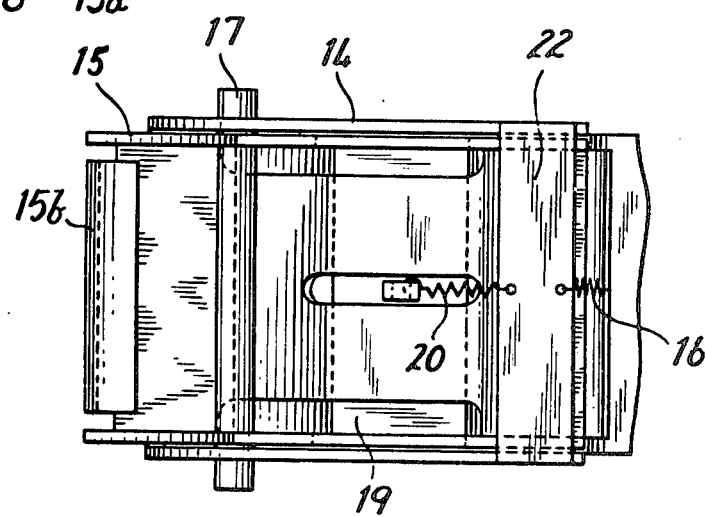
FIG. 3 is a top view of the embodiment.
Figure 4:
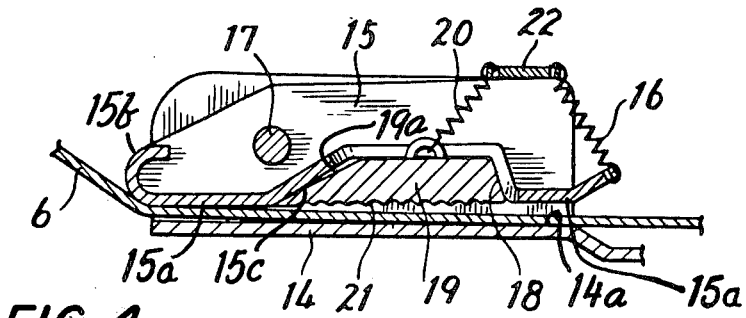
FIG. 4 is a side view in cross section of the embodiment showing the normal condition of the mechanism, i.e., the positions of the components in other than an emergency locking condition.

An exemplary embodiment of the device 13 is shown in greater detail in FIGS. 2 and 3. The embodiment includes a generally U-shaped base member 14 of a width slightly greater than the width of the belt with which it is used and having a shaft or axle 17 mounted between the side legs generally toward the forward end, i.e., to the left in the figures. A generally U-shaped clamp holder 15 is mounted to pivot on the axle and is received within the base member 14. A spring 16 connected between the rearward end of the clamp holder and a crosspiece 22 affixed to the base member 14 resiliently urges the clamp holder about the axle in a direction which lifts the rearward end (the end to the right in the drawings) and pushes the front end down. The upper surface 14a of the base or web portion of the base member 14 and opposed surfaces 15a of the clamp holder 15 define a narrow gap through which the belt passes, as is described in greater detail below in connection with FIGS. 4 through 7. The front end of the clamp holder is rounded to provide a curved nose portion 15b.

A clamp 19 is received in a recess 18 formed in the base portion of the clamp holder 15. The clamp 19 is normally pulled up to nest in the recess 18 by a spring 20 which leads from the clamp to the crosspiece 22. Generally matching wedge surfaces 19a and 15c on the clamp 19 and the clamp holder 15, respectively, at the forward end of the recess 18 lie forwardly obliquely and transversely of the holder 15. The downwardly facing surface 21 of the clamp 19 is corrugated, provided with teeth or otherwise treated effectively to grip and prevent movement of the belt under an emergency condition, as described below. The gripping surface 21 is generally contiguous to the surfaces 15a of the clamp holder 15 but protrudes slightly below to ensure gripping of the belt in operation.

In the normal condition of the device (FIG. 4) the springs 16 and 20 lift the rearward portion of the clamp holder 15 and the clamp 19 upwardly clear of the surface of the belt 6 which is trained through the gap between the base member and holder. Meanwhile, the belt lies generally flat along the surface 14a of the base member 14 by virtue of the tension of the retractor 5 and the guiding of the belt at the forward end of the device by the nose portion 15b which is held down under the forces of the springs 16 and 20.

Figure 5:
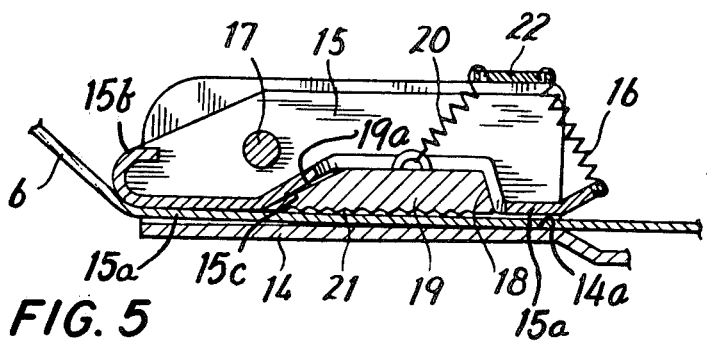
FIG. 5 shows the beginning of a locking action of the embodiment, the view being a side cross-sectional view.
Figure 6:
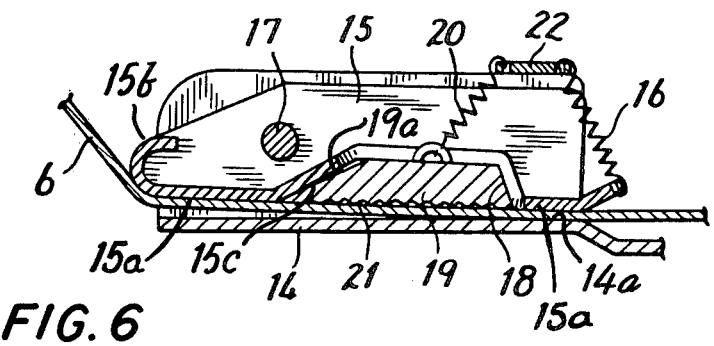
FIG. 6 is a side cross-sectional view showing the position of the components at a later stage in the sequence of operation.
Figure 7:
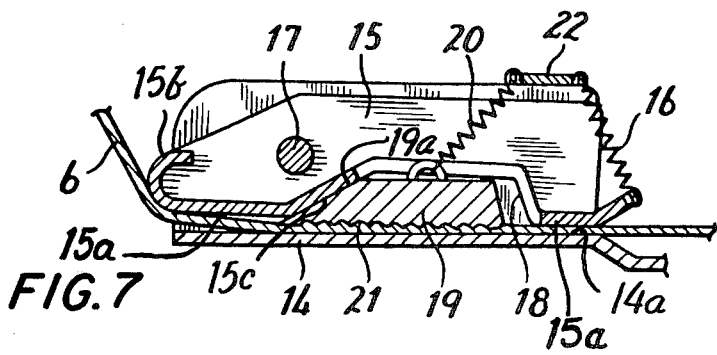
FIG. 7 shows the fully locked condition of the mechanism, also by way of a side cross-sectional view.

When an abrupt force, such as would usually occur in an emergency condition, is applied to the belt 6, the fact that the belt 6 leads obliquely at an angle away from the base member and wraps part way around the nose portion 15b of the clamp holder means that a force is applied to the clamp holder in a direction pivoting it against the force of the springs 20 and 16 (see FIG. 5). This, in turn, pushes the rearward end of the clamp holder and the clamp 19 toward the belt, thus pushing the clamp against the upper surface of the belt so that the corrugations or other gripping elements of the gripping surface 21 of the clamp engage the belt. A small movement of the clamp forwardly within the recess 18 of the holder (see FIG. 6) causes the wedging surfaces of the clamp and recess to wedge the clamp into tight gripping engagement with the belt, as shown in FIG. 7. The greater the force applied to the belt, the greater is the wedging action exerted on the clamp 19 and the greater the hold on the belt against being pulled forward.

When the abnormal tension applied to the belt ceases after the emergency condition is over, the rocking force applied to the nose portion of the clamp holder 15 is removed, and springs 16 and 20 restore the clamp holder and clamp to the initial state, i.e., the condition shown in FIG. 5, in which the clamp 19 is received in a generally nested relation within the recess 18 and the nose 15b of the clamp holder 15 is pivoted down. The retractor 5 assists in restoring the device to its normal configuration by tending to retract the belt 6 and move the clamp 19 rearwardly so that it can retract into the recess.

The above-described embodiment of the invention is intended to be merely exemplary, and numerous variations and modifications will be readily apparent to those skilled in the art without departing from the spirit and scope of the invention. All such variations and modifications are intended to be included within the scope of the invention as defined in the appended claims.

I claim:

1. A device for preventing a belt from being pulled from an emergency locking retractor or the like comprising a clamp holder and a base member having closely spaced surfaces defining a narrow gap through which the belt passes and from which the belt runs off forwardly at an angle generally away from the base member around a forward nose portion of the clamp holder, a clamp received by the clamp holder and having a belt-gripping surface which is generally continuous to but protrudes from said surface of the clamp holder and defines part of the belt-receiving gap, generally matching wedge surfaces on the clamp holder and clamp oriented forwardly obliquely and transversely to the belt-receiving gap and adapted selectively to wedge the clamp into engagement with the belt upon abrupt movement of the belt forwardly through the gap, means mounting the clamp holder for pivotal movement about an axis transverse to the direction of movement of the belt, spaced from the gap and intermediate of the forward end of said gap and the rearward end of the gripping surface of the clamp, and means resiliently urging the clamp and clamp holder about the pivot axis in a direction tending to move the nose portion of the clamp holder toward said surface of the base member and to hold the clamp away from the belt, the resilient means yielding to a force exerted on the nose portion of the clamp holder upon an abrupt forward pull of the belt such that the clamp and clamp holder rotate about the pivot axis in a direction which brings the clamp into engagement with the belt, whereupon the clamp is pulled forward and is wedged toward said surface of the base and grips the belt and the belt is locked against forward movement.